United States Patent [19]
McKim et al.

[11] Patent Number: 5,119,966
[45] Date of Patent: Jun. 9, 1992

[54] SIMPLIFIED HINGE APPARATUS AND ASSOCIATED JOINING METHODS

[75] Inventors: Paul D. McKim; Konrad G. Chmielewski, both of Fort Smith, Ark.

[73] Assignee: Rheem Manufacturing Company, New York, N.Y.

[21] Appl. No.: 686,703

[22] Filed: Apr. 17, 1991

Related U.S. Application Data

[62] Division of Ser. No. 583,188, Sep. 14, 1990.

[51] Int. Cl.$^5$ .................. B65D 43/14; H02G 3/08
[52] U.S. Cl. .................... 220/3.8; 220/337; 220/340
[58] Field of Search ............. 220/341, 340, 338, 337, 220/3.8

[56] References Cited

U.S. PATENT DOCUMENTS

| | | | |
|---|---|---|---|
| 815,962 | 3/1906 | Larkin | 220/337 |
| 909,683 | 1/1909 | Sandner | |
| 1,441,599 | 1/1923 | Platt | 220/337 |
| 2,191,632 | 2/1940 | Smith | |
| 2,330,975 | 10/1943 | Jackson | 220/338 |
| 2,474,079 | 6/1949 | Thompson | 220/341 |
| 2,527,479 | 10/1950 | Hall | |
| 3,895,179 | 7/1975 | Wyatt | 174/50 |
| 3,967,803 | 7/1976 | Kienlen et al. | |
| 4,400,965 | 8/1983 | Schey | 72/334 |
| 4,582,435 | 4/1986 | Davis | |
| 4,721,406 | 1/1988 | Davis | |
| 4,856,316 | 8/1989 | Slasinski | 72/451 |
| 4,897,912 | 2/1990 | Slasinski | 29/432.2 |
| 4,910,853 | 3/1990 | Sawdon | 29/283.5 |

*Primary Examiner*—Joseph Man-Fu Moy
*Attorney, Agent, or Firm*—Konneker & Bush

[57] ABSTRACT

A cover plate is operatively secured to the body of a housing structure, over an access opening therein, by a pair of button clinch joints which interlock two tab portions of the cover plate with two wall portions of the housing body positioned on opposite sides of the access opening. The button clinch joints function as hinges which permit the cover plate to be pivoted between closed and open positions to respectively block and unblock the access opening. In addition to other manufacturing and operational advantages, the use of button clinch joints as hinge structures provides for very rapid and economical joining of the housing body and cover plate, and eliminates the necessity for welding or in any manner puncturing the cover plate or housing body to effect the cover plate attachment. The elimination of both welding and puncturing, in turn, advantageously permits the use of pre-coated cover plates and housing bodies since the clinching process used to form the cover plate hinge joints does not appreciably mar these pivotally connected components. Moveover, the pivotally interconnected cover plate and housing body remain securely affixed to one another without the use of screws, rivets or any other additional fastening parts.

6 Claims, 1 Drawing Sheet

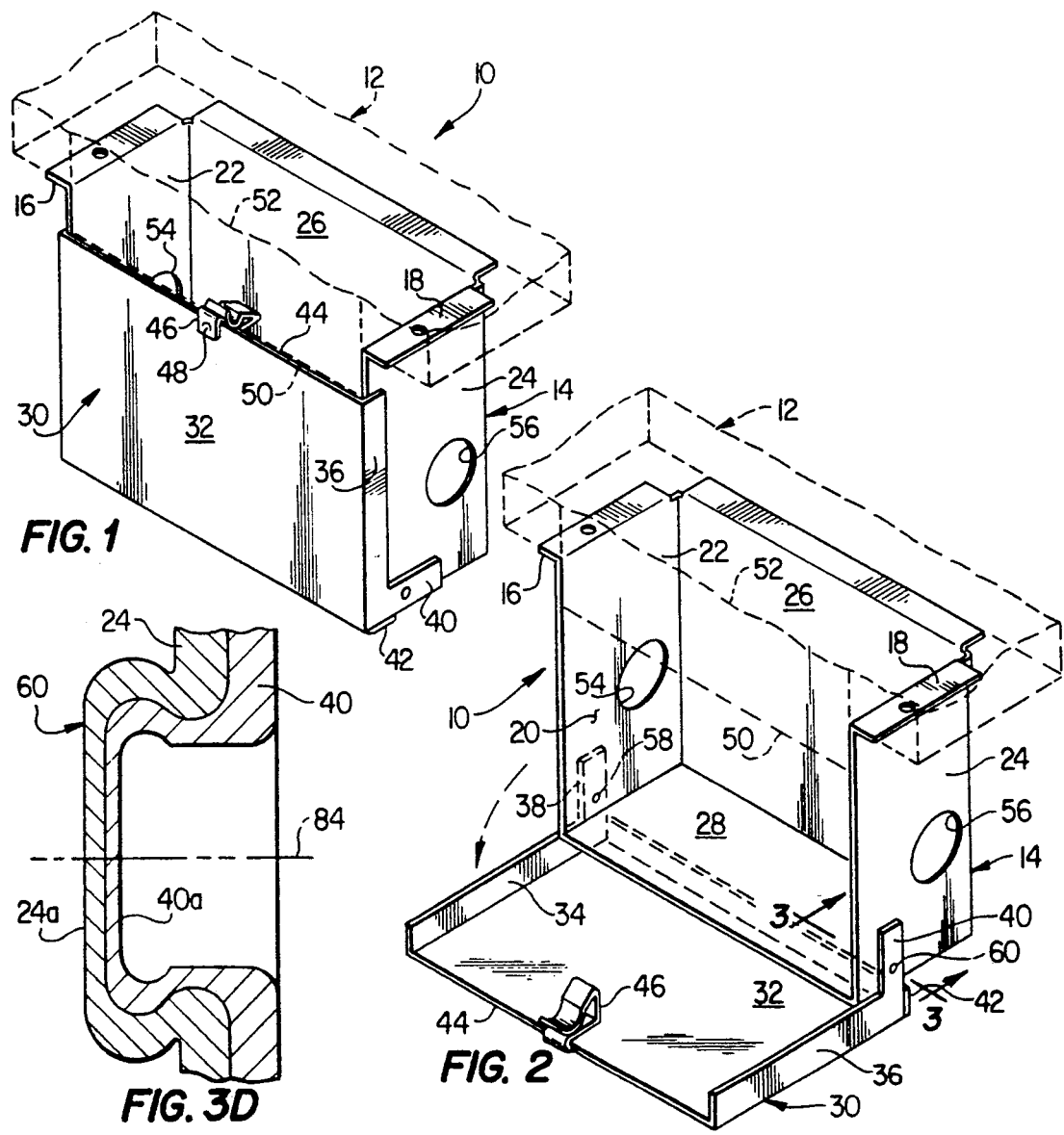
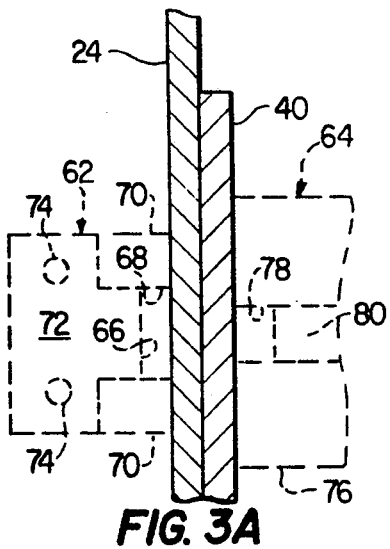
FIG. 1
FIG. 2
FIG. 3D
FIG. 3A
FIG. 3B
FIG. 3C

SIMPLIFIED HINGE APPARATUS AND ASSOCIATED JOINING METHODS

This application is a division of application Ser. No. 583,188, filed Sep. 14, 1990.

BACKGROUND OF THE INVENTION

The present invention generally relates to fastening apparatus and associated methods, and more particularly relates to hinge structures used to pivotally interconnect two objects.

The pivotal joining of two sheet metal components, such as a housing and its access opening cover plate, is conventionally accomplished using separate hinge structures which are operatively secured to each of the components by welds, various types of threaded fasteners or other types of separate securement structures such as rivets. A variety of well known problems, limitations and disadvantages are typically associated with this previous necessity of utilizing separate hinge structures to pivotally interconnect two sheet metal components.

For example, the need in the overall manufacturing process to provide and attach separate hinge structures increases both inventory and assembly costs, thereby correspondingly increasing the price of the finished product. Additionally, when a welding process is used to secure the separate hinge structures to the two components to be pivotally joined, considerable energy costs are incurred, expensive automated welding equipment is typically required, and the finish of the two components is marred, thereby precluding in many instances the ability to economically pre-coat the components before they are joined. Moreover, the checking of weld quality typically entails destructive testing.

When separate fastening members such as screws or rivets are used to secure hinge structures to the objects to be pivotally joined, the overall cost of the finished product is undesirably increased, and it is necessary to puncture one or both of the objects, thereby adding steps to the fabrication process and creating undesirable fluid leak paths through the walls of the product. The same is true when a rivet, pin or the like is directly utilized as the pivot element.

In view of the foregoing, it is an object of the present invention to provide a simplified, less expensive hinge structure which pivotally joins two objects, such as a housing body and its associated cover plate member, and eliminates or minimizes the above-mentioned problems, limitations and disadvantages typically associated with conventional hinge structures.

SUMMARY OF THE INVENTION

The present invention provides a simplified, inexpensive and rapidly formed hinge joint, for pivotally joining two objects formed from a permanently deformable sheet material such as sheet metal, utilizing a single round or "button" clinch joint at each pivot location.

In their conventional use, a series of clinch joints of this type are formed between two overlapping metal sheets to permanently anchor the sheets to one another and preclude all relative movement between the joined areas thereof. However, in developing representative embodiments of the present invention it has been found that a single button clinch joint formed between two overlapping sheets of permanently deformable material, such as metal or plastic, forms a very sturdy pivot joint therebetween without appreciably marring the side surfaces of the joined sheets, puncturing either of the sheets, or utilizing any additional attachment parts.

In a representative embodiment of the present invention, a sheet metal cover plate member is provided with a pair of spaced apart transverse connecting tab members which overlie opposite sidewall sections of a hollow sheet metal housing body positioned on opposite sides of an access opening of the housing body. Each of the two tabs is pivotally connected to its underlying housing body sidewall section by a single button clinch joint which permanently and imperforately secures the tab to its associated sidewall section but permits the tab to pivot relative to the sidewall section, about the longitudinal axis of the generally cylindrical single clinch joint, to thereby permit the cover plate member to be pivoted between closed and open positions in which it respectively blocks and unblocks the housing body access opening.

Compared to conventional hinge structures, each single clinch joint as used in the present invention provides a variety of advantages. For example, it eliminates the previous requirement for separate joining components, reduces the total number of fabrication steps needed to attach the cover plate member to the housing body, and eliminates the necessity of puncturing either the cover plate or the housing body to form the hinge joints therein. Additionally, since sections of the overlapping tabs and housing sections form the hinge joints, without the use of separate joining components, the total inventory count for the finished product is reduced.

Moreover, the unique use of single clinch joints as pivot connections allows the use of pre-coated metals because clinching does not destroy the surface finish of the joined section like welding does. Also, compared to spot welding, clinching requires less energy, provides greater joint strength under cyclic loading conditions, may be accomplished with equipment considerably less expensive than welding equipment, and may be quality checked using non-destructive testing methods.

BRIEF DESCRIPTION OF THE DRAWINGS

FIG. 1 is a perspective view of a representative housing structure which embodies principles of the present invention and has an access cover plate pivotally secured to the balance of the housing structure by a pair of button clinch joints, the cover plate being illustrated in its closed position;

FIG. 2 is a perspective view of the housing structure with the cover plate being pivoted to its open position;

FIGS. 3A-3C are enlarged scale partial cross-sectional views through the housing structure, taken along line 3—3 of FIG. 2, and sequentially illustrate the formation of one of the two button clinch joints thereon; and FIG. 3D is an enlargement of the finished button clinch joint shown in FIG. 3C.

DETAILED DESCRIPTION

Perspectively illustrated in FIGS. 1 and 2 is a representative housing structure, in the form of a fuse/breaker box 10, which embodies principles of the present invention and is secured to the underside of a control box 12 shown in dotted lines. The fuse/breaker box 10 is formed from sheet metal and includes a hollow rectangular body portion 14 having an open upper end with mounting flanges 16, 18 screwed to the underside of the control box 12, an open front side defining an access opening 20, a pair of opposite side walls 22 and 24, a rear side wall 26, and a lower end wall 28.

Pivotally secured to the housing structure body portion 14 in a unique manner subsequently described herein is a sheet metal cover plate member 30 having a front side wall 32, a pair of transversely bent side edge portions 34 and 36, a pair of joining sections in the form of connecting tabs 38 and 40 projecting outwardly from the bottom ends of the side edge portions 34 and 36, a transversely bent lower end edge portion 42, and a top end edge 44.

As illustrated in FIGS. 1 and 2, the cover plate member 30 is pivotally connected to the housing body portion 14 for movement between a closed position (FIG. 1) in which the cover plate member 30 blocks the access opening 20, and an open position (FIG. 2) in which the cover plate member 30 is downwardly pivoted to unblock the access opening 20. The cover plate member 30 may be releasably held in its closed position by means of a suitable spring clip member 46 hooked in a circular opening 48 formed through the cover plate front side wall 32 adjacent its top end edge 44, the clip member 46 being configured and positioned to underlie and releasably engage the lower side edge 50 of a cover plate section 52 of the control box 12 when the cover plate member 30 is moved to its closed position. A pair of large circular openings 54 and 56 are formed through the housing body side walls 22, 24 to receive electrical wiring or cable entering and exiting the interior of the fuse/breaker box 10.

To pivotally secure the cover plate member 30 to the housing body 14, the connecting tabs 38 and 40 are positioned so that they overlie outer side surface sections of the housing body side walls 22 and 24 adjacent their bottom ends as shown in FIG. 2. As will subsequently be described in conjunction with FIGS. 3A-3C, a single button clinch joint 58 is formed between the transverse connecting tab 38 and its underlying section of housing body side wall 22, and a single button clinch joint 60 is formed between the transverse connecting tab 40 and its underlying section of the housing side wall 24, the clinch joints 58 and 60 serving as hinges which permit the pivotal movement of the cover plate member 30 between its closed and opened positions illustrated in FIGS. 1 and 2. With the cover plate member 30 in its closed position, the cover plate side edge portions 34 and 36 outwardly overlie the housing body side walls 22 and 24, while the bottom end edge portion 42 of the cover plate member underlies the lower end wall 28 of the housing body 14.

Referring now to FIGS. 3A-3C, in forming the button clinch joint 60 (which is identical to the button clinch joint 58), a conventional clinch joint anvil structure 62 (FIG. 3A) is positioned against the inner side surface of the housing body side wall 24, while a conventional clinch joint pressing structure 64 is positioned against the outer side surface of the connecting tab 40. The anvil structure 62 has an anvil head surface 66 which defines the left end of a cylindrical cavity 68 laterally bounded by a pair of wing portions 70 pivotally connected to the anvil body 72 at points 74. The pressing structure 64 has a body portion 76 with a cylindrical passage 78 therein which is axially aligned with the cylindrical cavity 68 and coaxially receives a cylindrical press member 80.

With the anvil wings 70 held in their FIG. 3A position, the press member 80 is moved leftwardly within the passage 78 (FIG. 3B) to deform portions 40a and 24a of the connecting tab 40 and the housing body side wall 24 into the anvil cavity 68 as shown in FIG. 3B. The press member 80 is then forced further leftwardly into the anvil cavity 68 to drive the sheet metal portions 40a and 24a against the anvil head surface 66 (FIG. 3C), while the anvil wings 70 are permitted to pivot outwardly as indicated by the arrows 82. This, in turn, causes a thinning and radial expansion of the sheet metal portions 40a and 24a to form the button clinch joint 60 illustrated in FIGS. 3C and 3D. The clinch forming structures 62 and 64 may then be removed. The left button clinch joint 58 is formed in an identical manner.

As can be seen in FIG. 3D, the radially outwardly flared sheet metal portions 24a and 40a are interlocked in a manner essentially presenting the separation of the housing body side wall 24 and its associated connecting tab 40, while at the same time permitting the tab 40 to be pivoted relative to the housing body side wall 24 about the central axis 84 of the single button clinch joint 60. In a similar fashion, the connecting tab 38 is pivotable relative to the housing body side wall 22 about the central axis of the single button clinch joint 58.

It can readily be seen from the foregoing that a hinge structure pivotally interconnecting the cover plate member 30 and the housing body 14 has been formed, utilizing principles of the present invention, in a relatively rapid and quite inexpensive manner without the use of any separate hinge parts. The two single button clinch joints which define this rapidly formed hinge structure do not require that either of the tabs 38 and 40, or the housing side walls 22 and 24 be punctured, and the button clinch joints do not appreciably mar the surface finish of the interconnected housing body and cover plate portions. Accordingly, the housing body and its associated cover plate member may be precoated before the cover plate member is pivotally secured to the housing body. Moreover, to form the housing structure 10, only two components-namely the housing body and the cover plate member-need be provided. There is thus no need to inventory separate fastening structures such as hinges, screws, rivets or the like. Additionally, there is no need to employ a spot welding process to, for example, attach separate hinge structures. The overall assembly time and cost for the representative housing structure 10 are thus markedly reduced compared to conventional assembly techniques requiring separate hinge structures or elements.

The foregoing detailed description is to be clearly understood as being given by way of illustration and example only, the spirit and scope of the present invention being limited solely by the appended claims.

What is claimed is:

1. A housing structure comprising:
   a hollow housing body formed from a permanently deformable sheet material and having an access opening and a spaced apart pair of first wall portions;
   a cover member formed from a permanently deformable sheet material and having a spaced apart pair of second wall portions each positioned in a side-by-side relationship with a different one of said first wall portions; and
   means for permanently connecting said cover member to said housing body in a manner permitting said cover member to be pivoted relative to said housing body between closed and open positions in which said cover member respectively blocks and unblocks said access opening, said means for connecting, at each side-by-side pair of said first and second wall portions consisting of a single imperforate clinch joint formed between and pivotally interlocking the side-by-side first and second wall portions, said single imperforate clinch joint being defined by hollow, generally tubular protrusions formed on the side-by-side pair of said first and second wall portions and having transversely enlarged outer end portions, one of said protrusions being pivotally and coaxially received within the other protrusion with one of said transversely enlarged outer end portions being captively retained within the other of said transversely enlarged outer end portions.

2. The housing structure of claim 1 wherein:
said housing structure is a fuse/breaker box.

3. The housing structure of claim 1 wherein:
said hollow housing body and said cover member are formed from sheet metal.

4. A housing structure comprising:
a hollow housing body formed from a permanently deformable sheet material and having an access opening and a pair of side wall portions positioned on opposite sides of said access opening;

a cover member formed from a permanently deformable sheet material and having a spaced pair of transverse connecting tabs overlying sections of said side wall portions; and means for permanently securing said connecting tabs to said side wall sections in a manner permitting said cover member to be pivoted relative to said housing body between closed and open positions in which said cover member respectively blocks and unblocks said access opening, said means for pivotally securing, at each connecting tab, consisting of a single imperforate button clinch joint formed between the connecting tab and its associated side wall section and permitting relative pivotal movement between the tab and its associated side wall section, said single imperforate button clinch joint being defined by hollow, generally tubular protrusions formed on the connecting tab and its associated side wall section and having transversely enlarged outer end portions, one of said protrusions being pivotally and coaxially received within the other protrusion with one of said transversely enlarged outer end portions being captively retained within the other of said transversely enlarged outer end portions.

5. The housing structure of claim 4 wherein:
said housing structure is a fuse/breaker box.

6. The housing structure of claim 5 wherein:
said hollow housing body and said cover member are formed from sheet metal.

* * * * *